US008394568B2

(12) United States Patent
Qiu et al.

(10) Patent No.: US 8,394,568 B2
(45) Date of Patent: Mar. 12, 2013

(54) SYNTHESIS AND EMULSIFICATION OF RESINS

(75) Inventors: Shigang Qiu, Toronto (CA); Santiago Faucher, Oakville (CA); John Abate, Mississauga (CA); Allan Chen, Oakville (CA); Ke Zhou, Oakville (CA)

(73) Assignee: Xerox Corporation, Norwalk, CT (US)

( * ) Notice: Subject to any disclaimer, the term of this patent is extended or adjusted under 35 U.S.C. 154(b) by 625 days.

(21) Appl. No.: 12/610,704

(22) Filed: Nov. 2, 2009

(65) Prior Publication Data

US 2011/0104609 A1 May 5, 2011

(51) Int. Cl.
*G03G 9/13* (2006.01)
*C08J 3/02* (2006.01)

(52) U.S. Cl. .................................. 430/137.14; 523/335

(58) Field of Classification Search .............. 430/137.14
See application file for complete search history.

(56) References Cited

U.S. PATENT DOCUMENTS

| | | | |
|---|---|---|---|
| 3,590,000 | A | 6/1971 | Palermiti et al. |
| 3,847,604 | A | 11/1974 | Hagenbach et al. |
| 4,298,672 | A | 11/1981 | Lu |
| 4,338,390 | A | 7/1982 | Lu |
| 4,935,326 | A | 6/1990 | Creatura et al. |
| 4,937,166 | A | 6/1990 | Creatura et al. |
| 5,227,460 | A | 7/1993 | Mahabadi et al. |
| 5,236,629 | A | 8/1993 | Mahabadi et al. |
| 5,278,020 | A | 1/1994 | Grushkin et al. |
| 5,290,654 | A | 3/1994 | Sacripante et al. |
| 5,308,734 | A | 5/1994 | Sacripante et al. |
| 5,330,874 | A | 7/1994 | Mahabadi et al. |
| 5,344,738 | A | 9/1994 | Kmiecik-Lawrynowicz et al. |
| 5,346,797 | A | 9/1994 | Kmiecik-Lawrynowicz et al. |
| 5,348,832 | A | 9/1994 | Sacripante et al. |
| 5,364,729 | A | 11/1994 | Kmiecik-Lawrynowicz et al. |
| 5,366,841 | A | 11/1994 | Patel et al. |
| 5,370,963 | A | 12/1994 | Patel et al. |
| 5,403,693 | A | 4/1995 | Patel et al. |
| 5,405,728 | A | 4/1995 | Hopper et al. |
| 5,418,108 | A | 5/1995 | Kmiecik-Lawrynowicz et al. |
| 5,496,676 | A | 3/1996 | Croucher et al. |
| 5,501,935 | A | 3/1996 | Patel et al. |
| 5,527,658 | A | 6/1996 | Hopper et al. |
| 5,567,566 | A | 10/1996 | Mahabadi et al. |
| 5,585,215 | A | 12/1996 | Ong et al. |
| 5,650,255 | A | 7/1997 | Ng et al. |
| 5,650,256 | A | 7/1997 | Veregin et al. |
| 6,063,827 | A | 5/2000 | Sacripante et al. |
| 6,080,807 | A | 6/2000 | Campbell |
| 6,214,507 | B1 | 4/2001 | Sokol et al. |
| 6,593,049 | B1 | 7/2003 | Veregin et al. |
| 6,638,677 | B2 | 10/2003 | Patel et al. |
| 6,780,560 | B2 | 8/2004 | Farrugia et al. |
| 6,830,860 | B2 | 12/2004 | Sacripante et al. |
| 6,995,232 | B2 | 2/2006 | Howie et al. |
| 7,214,463 | B2 | 5/2007 | Patel et al. |
| 7,345,110 | B2 | 3/2008 | Gertzmann et al. |
| 7,432,324 | B2 | 10/2008 | Chen et al. |

(Continued)

OTHER PUBLICATIONS

Chung et al.; U.S. Appl. No. 12/056,529, filed Mar. 27, 2008.

*Primary Examiner* — Jonathan Jelsma
(74) *Attorney, Agent, or Firm* — Oliff & Berridge, PLC

(57) ABSTRACT

The present disclosure provides processes for producing resins suitable for use in forming toner compositions. In embodiments, the processes described herein comprise formation of latexes, including latexes for use in toners, produced without use of solvents.

13 Claims, 2 Drawing Sheets

U.S. PATENT DOCUMENTS

| | | | | |
|---|---|---|---|---|
| 7,572,567 | B2 | 8/2009 | Chung et al. | |
| 2005/0020787 | A1 | 1/2005 | Aert et al. | |
| 2005/0271965 | A1 * | 12/2005 | Kamiyoshi et al. | 430/111.4 |
| 2006/0115759 | A1 * | 6/2006 | Kim et al. | 430/109.4 |
| 2006/0286478 | A1 | 12/2006 | Chung et al. | |
| 2007/0020554 | A1 | 1/2007 | Chen et al. | |
| 2007/0059630 | A1 | 3/2007 | Chen et al. | |
| 2007/0141494 | A1 | 6/2007 | Zhou et al. | |
| 2008/0138738 | A1 | 6/2008 | Chung et al. | |
| 2008/0236446 | A1 | 10/2008 | Zhou et al. | |
| 2009/0208864 | A1 | 8/2009 | Zhou et al. | |
| 2009/0246680 | A1 | 10/2009 | Chung et al. | |

* cited by examiner

SQ PIE 246M CPE MW

Microtrac Inc 10.4.2

05/23/2008 10:30
DB Rec: 817

Nanotrac
U2275E

| Data Item | Value | Size(um) | %Tile | % Tile | Size(um) | Dia(um) | Vol% | Width |
|---|---|---|---|---|---|---|---|---|
| MV(um): | 0.0621 | | | 10.00 | 0.02878 | 0.0414 | 100.0 | 0.03 |
| MN(um): | 0.0348 | | | 20.00 | 0.0319 | | | |
| MA(um): | 0.0421 | | | 30.00 | 0.0351 | | | |
| CS: | 142.7 | | | 40.00 | 0.0382 | | | |
| SD: | 0.01726 | | | 50.00 | 0.0414 | | | |
| MW: | 2.31E+07 | | | 60.00 | 0.0464 | | | |
| Mz: | 0.0458 | | | 70.00 | 0.0606 | UDef Name | UDef Data | |
| ol: | 0.02400 | | | 80.00 | 0.0591 | | | |
| Skl: | 0.647 | | | 90.00 | 0.0866 | | | |
| Kg: | 2.018 | | | 95.00 | 0.1284 | | | |

SYNTHESIS AND EMULSIFICATION OF RESINS

BACKGROUND

The present disclosure relates to processes for formation of latex resins. In embodiments, the below described processes may be accomplished without the use of a solvent.

Processes for forming toner compositions for use with electrostatographic, electrophotographic or xerographic print of copy devices have been previously disclosed. For example, methods of preparing an emulsion aggregation (EA) type toner are known, and toners may be formed by aggregating a colorant with a latex polymer formed by batch or semi-continuous polycondensation. U.S. Pat. No. 6,063,827, the disclosure of which is hereby incorporated by reference in its entirety, is directed to a polycondensation process for the preparation of an unsaturated polyester. U.S. Pat. No. 5,227,460, the disclosure of which is hereby incorporated by reference herein in its entirety discloses partially cross-linked resins that can be selected for the preparation of heat fixable toners.

Other examples of emulsion/aggregation/coalescing processes for the preparation of toners are illustrated in U.S. Pat. Nos. 5,290,654, 5,278,020, 5,308,734, 5,370,963, 5,344,738, 5,403,693, 5,418,108, 5,364,729 and 5,346,797, the disclosures of each of which are hereby incorporated herein by reference in their entirety. Other processes are disclosed in U.S. Pat. Nos. 5,348,832, 5,405,728, 5,366,841, 5,496,676, 5,527,658, 5,585,215, 5,650,255, 5,650,256, and 5,501,935, the disclosures of each of which are hereby incorporated herein by reference in their entirety.

As discussed above, latex polymers utilized in the formation of EA type toners may be formed by batch, semi-continuous or continuous polymerization. Batch processes for producing these polymers may include the bulk polycondensation of resins in a batch reactor at an elevated temperature. Semi-continuous and continuous processes may include polycondensation reactions of resins undertaken in a series of reaction vessels connected in series. After the resulting resin is cooled, crushed and milled, the resin is dissolved in a solvent. The dissolved resin is then subjected to emulsification to prepare a polymer latex. Emulsification may include combining with stirring of the resin with organic solvents, such as methyl ethyl ketone and/or isopropyl alcohol to produce a homogenous organic phase. A fixed amount of base solution, such as ammonium hydroxide, may be added to the organic phase to neutralize acid end groups on the polymer chain, followed by the addition of deionized water to form a uniform dispersion of polymer particles in water through phase inversion. Any solvent(s) used remains in both the polymer particles and the aqueous phase of the emulsion, and the solvent(s) must then be removed, such as by a vacuum distillation method.

The use of solvents in the above emulsion processes may cause environmental concerns. For example, if the solvent level is not low enough (such as <50 ppm), extensive waste water treatment and solvent remediation may be required. Additionally, the removal of the residual solvents is energy-intense and time-consuming.

U.S. patent application Ser. No. 12/056,529 (Chung, et al.) describes a continuous solvent-free polyester emulsification process using a screw extruder, and is hereby incorporated herein in its entirety by reference.

U.S. Patent Application Publication No. 2007/0059630 (Chen, et al.) describes an emulsion polymerization process, and is hereby incorporated herein in its entirety by reference.

U.S. Patent Application Publication No. 2009/0208864 (Zhou, et al.) describes a solvent-free phase inversion process for producing resin emulsion, and is hereby incorporated herein in its entirety by reference.

U.S. Patent Application Publication No. 2007/0141494 (Zhou, et al.) describes a solvent-free toner making process using phase inversion, and is hereby incorporated herein in its entirety by reference.

A need exists for a process for forming toner particles without the use of environmentally hazardous solvent and without requiring crushing and dissolving of the polycondensation polymer to form an emulsion.

SUMMARY

The present disclosure provides processes for producing polyester resins suitable for use in forming toner compositions. In embodiments, the processes described herein comprise formation of polyester latexes, including polyester latexes for use in toners, produced without the use of solvents. In embodiments, neutralization agents may be utilized in the process to facilitate emulsification of the polyester polymer produced by condensation polymerization, which polymer may then be emulsified to form a polyester latex resin.

In embodiments, disclosed herein is a batch process for synthesizing a polyester latex, the process comprising: providing at least two polymerizable monomers, adding at least one polycondensation catalyst to the at least two polymerizable monomers to form a reaction mixture, polymerizing the at least two polymerizable monomers in the reaction mixture to form a polyester melt resin comprising at least one polyester, providing a neutralizing solution comprising at least one neutralizing agent and at least one surfactant to the polyester melt resin to form an emulsification solution, and emulsifying the at least one polyester in the emulsification solution to synthesize the polyester latex, and wherein the emulsifying is accomplished without use of a solvent.

In embodiments, disclosed herein is a process for synthesizing a polyester latex, the process comprising: providing to a first reaction vessel at least two polymerizable monomers and at least one polycondensation catalyst for forming a prepolymer, transferring the prepolymer to a second reaction vessel to form a reaction product, introducing the high molecular weight product to a third reaction vessel under reduced pressure to form a polyester melt resin comprising at least one amorphous polyester, crystalline polyester, or mixture thereof by heating the reaction mixture to a temperature of from about 25° C. to about 300° C., cooling the polyester melt resin to a temperature higher than a glass transition temperature of the amorphous polyester and/or higher than a crystallization temperature of the crystalline polyester and/or higher than a melting point of the crystalline polyester, transferring the polyester melt resin to a fourth reaction vessel, providing a neutralizing solution comprising at least one neutralizing agent and at least one surfactant to the polyester solution to form an emulsification solution in the fourth reaction vessel, and emulsifying the at least one polyester in the emulsification solution to form a polyester latex by slowly adding water to the emulsification solution until phase inversion occurs, and wherein the emulsifying is accomplished without use of a solvent.

In embodiments, disclosed herein is a process for producing a toner, the process comprising: providing at least two polymerizable monomers for forming a polyester, at least one of the at least two polymerizable monomers having at least one acid group, forming a reaction mixture by providing at least one polycondensation catalyst, polymerizing the at least two polymerizable monomers in the reaction mixture to form a polyester melt resin comprising at least one polyester, providing a neutralizing solution comprising at least one neutralizing agent and at least one surfactant to the polyester melt resin to form an emulsification solution, emulsifying the at least one polyester in the emulsification solution to form a polyester latex, combining the polyester latex with one or more colorant and an optional wax and aggregating the polyester latex, colorant and optional wax to form aggregated particles; coalescing the aggregated particles to form toner particles; and washing and drying the toner particles to achieve a toner.

EMBODIMENTS

Figure 1:
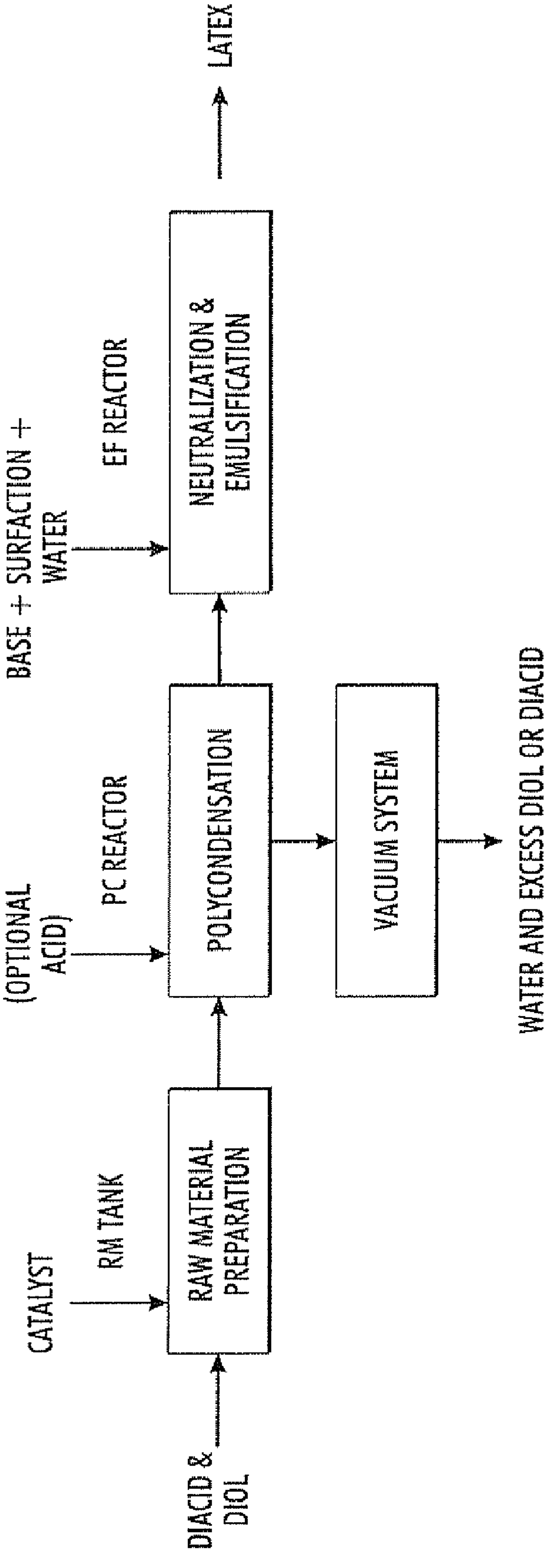
FIG. 1 is a chart depicting a polymer synthesis and emulsion process as described in embodiments of the present application.

The present disclosure provides processes for producing resins suitable for use in forming toner compositions. In embodiments, the processes described herein comprise formation of latexes, included latexes for use in toners, produced without the use of solvents. In embodiments, neutralization agents may be utilized in the process to accelerate emulsification of a polymer produced by condensation polymerization, which polymer may then be emulsified to form a latex resin by adding water and one or more surfactants.

Processes for making toner compositions in accordance with the present disclosure include a continuous polymerization process or a batch polymerization process to provide a latex resin that may be utilized to form a toner. The batch or continuous polymerization may be accomplished without the use of a solvent.

The main process steps may include raw material preparation, preliminary esterification, complete esterification, prepolycondensation, polycondensation, neutralization and emulsification.

In embodiments, the preliminary esterification may be conducted at about or above atmospheric pressure and at a temperature of from about 150° C. to about 205° C. In embodiments, the complete esterification may be conducted at a higher temperature than the preliminary esterification, such as at a temperature of from about 170° C. to about 265° C. In embodiments, the pre-polycondensation reaction is performed under vacuum and at high temperature, such as at a temperature of from about 200° C. to about 280° C. In embodiments, the polycondensation is accomplished at increased vacuum and further elevated temperatures, such as from about 220° C. to about 300° C. In embodiments, the neutralization is accomplished at about atmospheric pressure and a temperature of about 3° C. or more above the melting point of a crystalline resin, a temperature of about 8° C. or more above the crystallization temperature of a crystalline resin or a temperature of about 10° C. or more above the softening point of an amorphous resin.

In embodiments, the process may be accomplished in a single reactor vessel, such as in batch polymerization processes, or a series of reactor vessels, such as in a continuous polymerization process. This process begins with a polycondensation reaction of at least two monomers using a polymerizing catalyst to form a polyester.

Batch processes include performing the polycondensation polymerization and the emulsification in a single reaction vessel.

A continuous process is used for large capacities to produce a polyester melt resin and, subsequently, a resin emulsion. In this process, the polyester melt resin is directly emulsified, thereby reducing operating costs. This economic advantage also increases with higher throughput.

Continuous processes include performing the polycondensation polymerization in a series of connected reaction vessels, such as a continuous-stirred tank reactor (CSTR) system, including multiple reaction vessels such as a five-reactor configuration or a three-reactor configuration. After completion of polycondensation, the polyester resin may be transferred to a further CSTR where a neutralizing solution comprising at least one neutralizing agent and at least one surfactant may be added continuously. The neutralized polyester solution may then be discharged to another CSTR to permit further mixing, and, optionally, to a final CSTR, such as a five reactor CSTR, a three reaction CSTR, or a two reactor CSTR, where water may be added to begin emulsification of the polyester resin to form a latex. In this manner, a homogenous mixture may be formed by continuous polymerization and emulsification.

Polycondensation

In embodiments, a mixture of reagents may be fed into a reaction vessel through one or more supply ports to enable reactive reagents to be mixed to form a reaction solution. The reagents that may be introduced through the one or more supply ports may include one or more of each of a monomer, a diacid, a diol, a catalyst, and the like, useful in forming the desired end-point of resin melt determined by the softening point or viscosity. In embodiments, the reaction may take place under an inert gas, such as nitrogen, which may be introduced into the reaction vessel through the one or more access ports and may exit the reaction vessel through one or more outlet ports. A condenser may be attached to the reaction vessel to remove water vapor and the inert gas.

In embodiments, the resin of the latex may include at least one polymer. In embodiments, the polymer utilized to form the latex may be a polyester resin, including the 1 resins described in U.S. Pat. Nos. 6,593,049 and 6,756,176, the disclosures of each of which are hereby incorporated by reference herein in their entirety. The resins of latex may be crystalline or amorphous resins or mixtures thereof, as described in U.S. Pat. No. 6,830,860, the disclosure of which is hereby incorporated by reference in its entirety.

In embodiments, the resin may be formed by the polycondensation process of reacting a diol with a diacid in the presence of a catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decandiol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propandediol, lithio 2-sulfo-1,3-propanediol, potassio 2-sulfo-1,3-propanediol, mixtures thereof and the like. The aliphatic diol may be, for example, selected in an amount of from about 40 mole percent to about 60 mole percent of the resin, and the alkali sulf-aliphatic diol may be selected in an amount of from about 1 to about 10 mole percent of the resin.

Examples of organic diacids or diesters for the preparation of crystalline resins include oxalic acid, succinic acid, glutaric acid, adipic acid, suberic acid, azelaic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, including a diester or anhydride thereof; and an alkalki sulfa-organic diacid such as the sodio, lithio or potassio salt of dimethyl-5-suflo-isophthalate, dialkyl-5-sulfo-isophthalate-4-sulfa-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfo-3,3-dimethylpentanediol, sulfo-p-hydroxybenzoic acid, N,N-bis(2-hydroxyethyl)-2-amino ethane sulfonate, and mixtures thereof. The organic diacid may be selected in an amount of, for example, from about 40 mole percent to about 60 mole percent of the resin, and the alkali sulfo-aliphatic diacid may be selected in an amount of from about 1 mole percent to about 10 mole percent of the resin.

Examples of crystalline resins include polyesters, polyamides, polyimides, polyolefines, polyethylene, polybutylene, polyisobutyrate, ethylene-propylene copolymers, ethylene-vinyl acetate copolymers, polypropylene, mixtures thereof and the like. Specific crystalline resins may be polyester based, such as poly(ethylene-adipate), poly(propylene-adipate), poly(butylenes-adipate, poly(pentylene-adipate), poly(hexylene-adipate), poly(octylene-adipate), poly(ethylene-succinate), polypropylene-succinate), poly(butylene-succinate), poly(pentylene-succinate, poly(hexylene-succinate), poly(octylene-succinate), poly(ethylene-sebacate), poly(propylene-sebacate), poly(butylene-sebacate), poly(pentylene-sebacate, poly(hexylene-sebacate), poly(octylene-sebacate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfoisophthaloyl)-copoly(pentylene-adipate), alkali copoly(5-sulfoisophthaloyl)-copoly(hexylene-adipate), alkali copoly(5-sulfoisophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylene-succinate, alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfoisophthaloyl)-copoly(ethylene-sebacate), alkali copoly(5-sulfoisophthaloyl)-copoly(propylene-sebacate), alkali copoly(5-sulfoisophthaloyl)-copoly(butylene-sebacate), alkali copoly(5-sulfoisophthaloyl)-copoly(pentylene-sebacate), alkali copoly(5-sulfoisophthaloyl)-copoly(hexylene-sebacate), alkali copoly(5-sulfoisophthaloyl)-copoly(octylene-sebacate) and the like wherein alkali is a metal such as sodium, lithium or potassium. Examples of polyamides include poly(ethylene-adipamide), poly(propylene-adipamide), poly(butylene-adipamide), poly(pentylene-adipamide), poly(hexylene-adipamide), poly(octylene-adipamide), poly(propylene-sebecamide) and the like. Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide) and the like.

The crystalline resin may possess any appropriate melting point, such as from about 30° C. to about 120° C., or from about 50° C. to about 90° C., and any appropriate crystallization temperature, such as from about 20° C. to about 110° C., or from about 40° C. to about 80° C. The crystalline resin may have a number average molecular weight ($M_n$), as measured by gel permeation chromatography (GPC) of, for example, for about 1,000 to about 12,000, such as from about 2,000 to about 10,000, and a weight average molecular weight ($M_w$) of, for example from about 2,000 to about 100,000, such as from about 3,000 to about 80,000, as determined by GPC using polystyrene standards. The molecular weight distribution ($M_w/M_n$) of the crystalline resin may be, for example, from about 2 to about 6, such as from about 2 to about 4.

In embodiments, the polymer resin may also be an amorphous polyester resin. Examples of diacids or diesters selected for the preparation of amorphous polyester resins include dicarboxylic acids or diesters selected from the group consisting of terephthalic acid, phthalic acid, isophthalic acid, fumaric acid, maleic acid, maleic anhydride, itaconic acid, succinic acid, succinic anhydride, dodecylsuccinic acid, dodecylsuceinie anhydride, glutaric acid, glutaric anhydride, adipic acid, pimelic acid, suberic acid, azelic acid, dodecanediacid, dimethyl terephthalate, diethyl terephthalate, dimethylisophtlhalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacids or diesters may be present in, for example, from about 40 mole percent to about 60 mole percent of the resin.

Examples of diols utilized in preparing an amorphous polymer include 1,2-propanediol, 1,3-propanediol, 1,2-butanediol, 1,3-butanediol, 1,4-butanediol, pentanedial, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and mixtures thereof. The organic diol may be present in, for example, from about 40 mole percent to about 60 mole percent of the resin.

Polycondensation catalysts which may be utilized for either the crystalline or amorphous polymers include tetraalkyl titanates; dialkyltin oxides, such as dibutyltin oxid; tetraalkyltins, such as dibutyltin dilaurate; dialkyltin oxide hydroxides, such as butyltin oxide hydroxide; aluminum alkoxides; alkyl zinc; dialkyl zinc; zinc oxide; stannous oxide; titanium (IV) alkoxides such as titanium (IV) butoxide, titanium (IV) iso-propoxide; and mixtures thereof. Such catalysts may be utilized in amounts of, for example, from about 0.001 mole percent to about 0.05 mole percent based on the amount of the starting diacid or diester used to generate the polymer.

Examples of amorphous resins include polyester resins, branched polyester resins, polyimide resins, branched polyimide resins, poly(styrene-acrylate) resins, crosslinked, for example from about 25 percent to about 70 percent, poly(styrene-acrylate) resins, polystyrene-methacrylate) resins, crosslinked poly(styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated polystyrene-acrylate) resins, poly(styrene-methacrylate) resins, crosslinked alkali sulfonated-poly(styrene-methacrylate) resins, alkali sulfonated-poly(styrene-butadiene) resins, and crosslinked alkali sulfonated poly (styrene-butadiene) resins. In embodiments, the amorphous resin may be a Alkali sulfonated polyester resins, such as the metal or alkali salts of copoly(ethylene-terephthalate)-copoly (ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly (propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly (ethoxylated bisphenol-A-5-sulfo-isophthalate), and wherein the alkali metal is, for example, a sodium, lithium or potassium ion.

In embodiments, dodecanedioic acid, nonanediol, and a catalyst butyl tin oxide may be used as raw materials. The molar ratio of the acid to the alcohol may be from about 0.25 to about 2.0, such as from about 0.75 to about 1.5, or about 0.90 to 1.10.

The amorphous resin can possess various glass transition temperatures (Tg) of, for example, from about 40° C. to about 100° C., in embodiments from about 50° C. to about 70° C. The amorphous resin may have a number average molecular weight ($M_n$), for example, from about 1,000 to about 10,000, in embodiments from about 2,000 to about 8,000, and a weight average molecular weight ($M_w$) of, for example, from about 2,000 to about 150,000, in embodiments from about 3,000 to about 80,000, as determined by Gel Permeation Chromatography (GPC) using polystyrene standards. The molecular weight distribution ($M_w/M_n$) of the crystalline resin may be, for example, from about 2 to about 15, in embodiments from about 2 to about 9.

Other examples of suitable latex resins or polymers which may be produced include poly(styrene-butadiene), poly(methylstyrene-butadiene), poly(methyl methacrylate styrene-butadiene), poly(ethyl methacrylate styrene-butadiene), poly (propyl methacrylate styrene-butadiene), poly(butyl methacrylate styrene-butadiene), poly(methyl acrylate styrene-butadiene), polystyrene-isoprene), poly(methylstyrene-isoprene), poly(methyl methacrylate-isoprene, poly(ethyl methacrylate-isoprene), poly(propyl methacrylate-isoprene), poly(butyl methacrylate-isoprene), poly(methyl acrylate-isoprene), poly(propyl acrylate-isoprene), poly(butyl acrylate-isoprene), polystyrene-propyl acrylate), poly(styrene-butyl acrylate), poly(styrene-butadiene-acrylic acid), poly(styrene-butadiene-methacrylic acid, poly(styrene-butadiene-acrylonitrile-acrylic acid, poly(styrene-butyl acrylate-acrylic acid), poly(styrene-butyl acrylate-methacrylic acid), poly (styrene-butyl acrylate-acrylonitrile), poly(styrene-butyl acrylate-acrylonitrile-acrylic acid) and combinations thereof.

In embodiments, an unsaturated polyester resin may be utilized as a polymer resin. Examples of such resins include those disclosed in U.S. Pat. No. 6,063,827, the disclosure of which is hereby incorporated by reference in its entirety. Exemplary unsaturated polyester resins include, but are not limited to, poly(propoxylated bisphenol co-fumarate), poly (ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly (ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly (ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, the polymer may comprise a block copolymer, random copolymer, alternating copolymer and mixtures thereof.

In addition, polymer resins obtained from the reaction of bisphenol A and propylene oxide or propylene carbonate, such as those described in U.S. Pat. No. 5,227,460, the disclosure of which is hereby incorporated by reference in its entirety), and branched polymer resins resulting from the reaction of dimethylterephthalate with 1,3-butanediol, 1,2-propanediol and pentaerythritol may also be used.

One, two, or more toner resins may be used. In embodiments where two or more toner resins are used, the toner resins may be in any suitable ratio (such as a weight ratio), such as for instance about 10% (first resin)/90% (second resin) to about 90% (first resin)/10% (second resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

After polycondensation, the resulting polyester may have acid groups at the terminal end of the resin. Acid groups which may be present include, for example, carboxylic anhydrides, carboxylic acid salts, combinations thereof and the like. The number of carboxylic acid groups may be controlled by adjusting the starting materials and reaction conditions to obtain a resin that possesses excellent emulsion characteristics.

In embodiments, the reaction mixture may be heated to an appropriate temperature to achieve polycondensation of the at least two monomers. In embodiments, the reaction mixture may be heated to a temperature of from about 65° C. to about 360° C., such a from about 125° C. to about 300° C., from 150° C. to about 250° C., or from about 175° C. to about 225° C.

In embodiments, the reaction mixture may be maintained at the heated temperature for any time period appropriate to complete polycondensation, such as from about 1 minute to about 100 minutes, from about 5 minutes to about 60 minutes, or from about 10 minutes to about 30 minutes.

The rate of polycondensation may be controlled in part, by controlling the rate of removal of water vapor from the reaction vessel. In embodiments, removal of water vapor from the reaction vessel may increase the rate of polycondensation. In embodiments, a vacuum may be applied to the reaction vessel to increase the rate of polycondensation.

In embodiments, an inert gas may be introduced to the reaction vessel to prevent oxidation and other undesirable reactions that may interfere with the polycondensation reaction.

The end point of the polycondensation reaction may be determined by the desired molecular weight of the polymer, which correlates to the melt viscosity of acid value of the material. The molecular weight and molecular weight distribution (MWD) may be determined by Gel Permeation Chromatography (GPC). In embodiments, these parameters may be controlled or consistently obtained by adjusting the rate of the polycondensation, such as by controlling the temperature and/or the rate of removal of water from the reaction vessel during the polycondensation process.

The molecular weight of the polymer may be any desirable molecular weight, such as from about 3,000 g/mol to about 150,000 g/mol, from about 8,000 g/mol to about 100,000 g/mol, or from about 10,000 g/mol to about 90,000 g/mol.

After the polycondensation process is complete, the resulting polyester melt resin, comprising at least one polyester formed from the at least two monomers, may be cooled to a temperature of from about 50° C. to about 150° C., such as from about 90° C. to about 100° C.

In embodiments, the polyester melt resin may be transferred to a different reaction vessel after polycondensation is complete. In embodiments, the polyester melt resin may be retained in the polycondensation reaction vessel.

Neutralization

Once polycondensation is complete, the process materials (also referred to at this stage as the polyester melt resin) may be partially or fully neutralized. In embodiments, neutralization includes providing one or more neutralizing agent, such as a base, to the polyester melt resin, to neutralize any acid groups present on the polyester resin produced by the polycondensation process. In embodiments, the neutralizing agent is added to the polyester melt resin in the form of a neutralizing solution, which may include one or more neutralizing agent, one or more surfactant as described below, and, optionally, water. The neutralization may be accomplished without that use of a solvent.

Any suitable neutralization agent may be utilized. Examples of neutralizing agents include, for example, ammonium hydroxide, potassium hydroxide, sodium hydroxide, sodium carbonate, sodium bicarbonate, lithium hydroxide, potassium carbonate, triethyl amine, triethanolamine, pyridine, pyridine derivatives, diphenylamine, diphenylamine derivatives, poly(ethylene amine), poly(ethylene amine) derivatives, amine bases and piperazine. Derivatives are defined as any compound or material derived from a base compound, such as pyridine, diphenylamine or poly(ethylene amine), by reaction, addition, alteration, substitution or otherwise.

After neutralization, the hydrophilicity, and thus the emulsifiability of the resin, may be improved when compared with a resin that did not undergo such neutralization process. The degree of neutralization may be controlled, in embodiments, by the concentration of base in the neutralization solution added and the feeding rate of the neutralization solution.

The base may be included in the neutralization solution at any appropriate concentration, such as from about 1 percent by weight to about 20 percent by weight, or from about 2 percent by weight to about 10 percent by weight, of the total weight of the reaction solution. In embodiments, the rate of addition of the neutralizing solution may be any appropriate rate, such as from about 0.1% of resin weight per minute to about 20% of resin weight per minute, or such as from about 0.4% of resin weight per minute to about 12% of resin weight per minute. The resulting partially neutralized resin may have a pH of from about 8 to about 13, such as from about 11 to about 12.

Any effective neutralization ratio, defined as moles of base required/moles of acid, may be utilized. The base to resin ratio is determined by the acid value of the polymer resin. In embodiments, the neutralization ratio may be, for example, from about 50% to about 500%, such at from about 75% to about 400%, such as from about 100% to about 300%.

Emulsification

The partially neutralized polyester melt resin may be emulsified, for example by adding an emulsifying agent, such as an aqueous stabilizer, and optionally water, at a controlled rate, to form an emulsification solution. As discussed above, the present process does not require the use of solvents, at least because the neutralized resin has excellent emulsifiability as discussed above. By eliminating the use of solvents in the emulsification process, the additional time and energy required to later remove the solvent from the polyester latex can be avoided. This saves on both solvent purchases and solvent disposal costs and reduces liabilities associated with solvent storage. Further, the environmental impact of using hazardous solvents may also be prevented.

In embodiments, the emulsification solution may be heated to achieve emulsification. In embodiments, the emulsification solution may be heated to a temperature of about 3° C. or more, such as about 13° C. or more, higher than the melting point of the crystalline polymer, or about 8° C. or more higher than the crystallization temperature of a crystalline resin, such as about 10° C. or more higher than the crystallization temperature of a crystalline resin, or about 10° C. or more higher than the softening point of an amorphous polymer, such as about 20° C. or more higher than the softening point of an amorphous polymer to permit the proper flow of the resin in the reaction vessel and to facilitate sufficient emulsification of the resin particles.

In embodiments, the emulsification solution may be heated to an appropriate temperature dependent upon the resin being used. For example, the emulsification solution may be heated to a temperature of from about 70° C. to about 180° C., such as from about 80° C. to about 160° C., or from about 90° C. to about 120° C.

Any appropriate emulsification agent may be utilized. In embodiments, the emulsification agent may be an aqueous stabilizer, such as one or more surfactants.

The surfactants may be selected from ionic surfactants and nonionic surfactants. Anionic surfactants and cationic surfactants are encompassed by the term “ionic surfactants.” In embodiments, the surfactant may be added as an aqueous solution with a concentration from about 5% to 100% (pure surfactant) by weight, or from about 30% to 100% by weight. In embodiments, the surfactant may be utilized so that it is present in an amount of from about 0.01% to about 20% by weight of the resin, for example from about 0.1% to about 10% by weight of the resin, in embodiments from about 1% to about 8% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R, NEOGEN SC obtained from Daiichi Kogyo Seiyaku, combinations thereof, and the like. Other suitable anionic surfactants include, in embodiments, DOWFAX 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL and ALKAQUAT, available from Alkaril Chemical Company, SANIZOL (benzalkonium chloride), available from Kao Chemicals, and the like, and mixtures thereof.

Examples of nonionic surfactants that can be utilized for the processes illustrated herein and that may be included in the emulsion are, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. Other examples of suitable nonionic surfactants include a block copolymer of polyethylene oxide and polypropylene oxide, including those commercially available as SYNPERONIC PE/F, in embodiments SYNPERONIC PE/F 108.

In embodiments, the process may further comprise adding water after the addition of the neutralization agent and optional surfactant. In embodiments, the water may be metered into the mixture at a rate of about 0.01% to about 20% by weight of the resin per minute, such as from about 0.5% to about 5% by weight of the resin per minute, or from about 1% to about 4% by weight of the resin per minute.

The size of the polymer particles in the emulsion and their size distribution may be controlled by adjusting the degree of neutralization of the acid groups, the amount of stabilizer added, and the residence time of the resin in the neutralization and emulsification stages. In embodiments wherein the process is a continuous polymer emulsification, the residence time during the various stages, such as the emulsification stage, may be long enough to ensure the polymer is emulsified and the latex emulsion is stable.

The polyester resin may have any desirable particles size. For example, the polyester resin may have a particle size of from about 20 nm to about 500 nm, such as from about 30 nm to about 300 nm.

The emulsion may further be subjected to an optional homogenization step in a homogenizer, such as a blender, mixer or extruder. In embodiments, the homogenization may be accomplished at a temperature of from about −10° C. to about 100° C., such as from about 40° C. to about 95° C., such as from about 60° C. to about 90° C.

In embodiments, an optional additional aqueous stabilizer solution may be added to the emulsion during the optional homogenization step to stabilize the polymer particles. Any effective aqueous stabilizer may be used in any effective amount. For example, the aqueous stabilizer may be present in a concentration of from about 0.1 percent by weight to about 20 percent by weight of the emulsification solution, such as from about 1 percent by weight to about 8 percent by weight of the emulsification solution.

In embodiments, the polyester particles in the latex may be subjected to sonification to accelerate the formation of particles of a desired nanometer size. Sonification methods include, for example, ultrasound, extrusion, combinations thereof and such. In embodiments, sound waves having a frequency of from about 15 kHz to about 25 kHz, such as from about 17 kHz to about 22 kHz, may be utilized for a period of time of from about 5 seconds to about 5 minutes, such as from about 30 seconds to about 3.5 minutes to achieve polyester particles having the desired size.

In embodiments, polymer particles achieved with the optional homogenization and/or sonification processes may be of any appropriate size, such as, for example, of from about 20 nm to about 500 nm in diameter, such as from about 30 nm to about 400 nm.

Catalysts

In embodiments, the latex emulsion may also include a hardener or catalyst for crosslinking the resin. The catalyst may be a thermal crosslinking catalyst, for example a catalyst that initiates crosslinking at temperatures of, for example, about 160° C. or less, such as from about 50° C. to about 160° C., or from about 100° C. to about 160° C.

Examples of suitable crosslinking catalysts include, for example, blocked acid catalysts such as available from King Industries under the name NACURE, for example including NACURE SUPER XC-7231 and NACURE XC-AD230. Other known catalysts to initiate crosslinking may also be used, for example including catalysts such as aliphatic amines and alicyclic amines, for example bis(4-aminocyclohexyl) methane, bis(aminomethyl)cyclohexane, m-xylenediamine, and 3,9-bis(3-aminopropyl)-2,4,8,10-tetraspiro[5,5]undecane; aromatic amines, for example metaphenylene diamine, diaminodiphenylmethane, and diaminodiphenyl sulfone; tertiary amines and corresponding salts, for example benzyldimethylamine, 2,4,6-tris(dimethylaminomethyl)phenol, 1,8-diazabicyclo(5,4,0)undecene-7,1,5-diazabicyclo(4,3,0) nonene-7; aromatic acid anhydrides, for example phthalic anhydride, trimellitic anhydride, and pyromellitic anhydride; alicyclic carboxylic anhydrides, for example tetrahydrophthalic anhydride, methyltetrahydrophthalic anhydride, hexahydrophthalic anhydride, methylhexahydrophthalic anhydride, methylendomethylenetetrahydrophthalic anhydride, dodecenylsuccinic anhydride, and trialkyltetrahydrophthalic anhydrides; polyvalent phenols, for example catechol, resorcinol, hydroquinone, bisphenol F, bisphenol A, bisphenol S, biphenol, phenol novolac compounds, cresol novolac compounds, novolac compounds of divalent phenols such as bisphenol A, trishydroxyphenylmethane, aralkylpolyphenols, and dicyclopentadiene polyphenols; imidazoles and salts thereof, for example 2-methylimidazole, 2-ethyl-4-methylimidazole, and 2-phenylimidazole; $BF_3$ complexes of amine; Bronsted acids, for example aliphatic sulfonium salts and aromatic sulfonium salts; dicyandiamide; organic acid hydrazides, for example adipic acid dihydrazide and phthalic acid dihydrazide; resols; polycarboxylic acids, for example adipic acid, sebacic acid, terephthalic acid, trimellitic acid, polyester resins containing carboxylic groups; organic phosphines; combinations thereof and the like.

The catalyst may be included in any effective amount, such as from about 0.01% to about 20% by weight of the emulsion, from about 0.05% to about 10%, or from about 0.1% to about 10% by weight of the emulsion.

If a catalyst is used, the catalyst may be incorporated into the polyester latex by, for example, melt mixing prior to the emulsification. In embodiments, the catalyst may be added to the emulsion subsequent to emulsification.

In embodiments, the emulsion has good storage stability, for example being able to remain substantially stable over time at room temperature conditions.

Toners

The polyester latex formed as described above may be utilized to form toner compositions. Such toner compositions may include optional colorants, waxes, and other additives. Toners may be formed utilizing any method within the purview of those skilled in the art.

Colorants

Examples of colorants include dyes, pigments, mixtures of dyes, mixtures of pigments, mixtures of dyes and pigments, and the like, may be included in the toner. The colorant may be included in the toner in an amount of, for example, about 0.1 to about 35 percent by weight of the toner, such as from about 1 to about 20 weight percent of the toner, or from about 3 to about 15 percent by weight of the toner.

As examples of suitable colorants, mention may be made of carbon black like REGAL 330R; magnetites, such as Mobay magnetites MO8029, MO8060; Columbian magnetites; MAPICO BLACKS and surface treated magnetites; Pfizer magnetites CB4799, CB5300, CB5600; CX6369; Bayer magnetites, BAYFERROX 8600, 8610; Northern Pigments magnetites, NP-604, NP-608; Magnox magnetites TMB-1100, or TMB-104; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments may be water based pigment dispersions.

Specific examples of pigments include SUNSPERSE 6000, FLEXIVERSE and AQUATONE water based pigment dispersions from SUN Chemicals, HELIOGEN BLUE L6900, D6840, D7080, D7020, PYLAM OIL BLUE, PYLAM OIL YELLOW, PIGMENT BLUE 1 available from Paul Uhlich & Company, Inc., PIGMENT VIOLET 1, PIGMENT RED 48, LEMON CHROME YELLOW DCC 1026, E.D. TOLUIDINE RED and BON RED C available from Dominion Color Corporation, Ltd., Toronto, Ontario, NOVAPERM YELLOW FGL, HOSTAPERM PINK E from Hoechst, and CINQUASIA MAGENTA available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido)phthalocyanine, x-copper phthalocyanine pigment listed in the Color Index as CI 74160, CI Pigment Blue, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Waxes

A wax may also be included with the polyester latex emulsion in a toner composition, or may be combined with the polyester latex and a colorant in forming toner particles. When included, the wax may be present in an amount of, for example, from about 1 weight percent to about 30 weight percent of the toner particles, such as from about 5 weight percent to about 25 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes such as commercially available from Allied Chemical and Petrolite Corporation, for example POLYWAX polyethylene waxes from Baker Petrolite, wax emulsions available from Michaelman, Inc. and the Daniels Products Company, EPOLENE N-15 commercially available from Eastman Chemical Products, Inc., and VISCOL 550-P, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550, SUPERSLIP 6530 available from Micro Powder Inc., fluorinated waxes, for example POLYFLUO 190 POLYFLUO 200, POLYSILK 19, POLYSILK 14 available from Micro Powder Inc., mixed fluorinated, amide waxes, for example MICROSPERSION 19 also available from Micro Powder Inc., imides, esters, quaternary amines, carboxylic acids or acrylic polymer emulsion, for example JONCRYL 74, 89, 130, 537, and 538, all available from SC Johnson Wax, and chlorinated polypropylenes and polyethylenes available from Allied Chemical and Petrolite Corporation and SC Johnson wax. Mixtures of waxes may also be used. Waxes may be included as, for example, fuser roll release agents.

Toner Preparation

In embodiments, a toner prepared with the latex emulsion of the present disclosure may include a latex, optionally a colorant (the toner composition is referred to as "colorless" or "clear" where a colorant is not used), optionally a wax, and optionally a charge control agent. In embodiments, prior to performing the emulsification processes described above, all of the toner ingredients, for example resin, aqueous alkaline solution, wax, colorant, and charge control agent, may be combined so that toner particles are formed upon emulsion. In other embodiments, the emulsification may be performed as described above to produce a latex emulsion, with the remaining toner ingredients added after the emulsification to form toner particles by any suitable manner.

In embodiments, toner particles may be formed via an EA process that uses polyester latex emulsions made using solvent flash or phase inversion emulsification (PIE), such as those toner methods described in U.S. Patent Application Publication No. 2008/0236446, the entire disclosure of which is hereby incorporated herein by reference.

Thus, in embodiments, prior to performing the phase inversion, "internal" toner ingredients, including resin, colorant, wax, and internal charge control agent, may be present in the mixture and it is optional to include the "external" toner ingredients prior to performing the phase inversion. The terms "internal" and "external" refer to whether the toner ingredients are found throughout the resulting toner particles or just on the surface thereof. In embodiments, prior to performing the phase inversion, the ingredients of the toner composition may be blended by melt-mixing at any suitable temperature of from about 60° C. to about 200° C., time of from about 10 minutes to about 10 hours, and stirring speed of from about 100 rpm to about 800 rpm.

In emulsification, the ingredient(s) of the toner composition may be present in any effective amount by weight, such as from about 5 percent by weight to about 35 percent by weight of the total weight of the emulsion, from about 5 percent by weight to about 20 percent by weight of the emulsion, or from about 10 percent by weight to about 20 percent by weight of the emulsion.

In other embodiments, toners may be prepared by a process that includes aggregating a mixture of a colorant, optionally a wax and any other desired or required additives, and the latex emulsion, and then optionally coalescing the aggregated particles.

In embodiments, a method of making the toner particles including the resin may include admixing and heating the latex emulsion described above and a colorant dispersion, an optional wax dispersion and other additives and adding thereto an aqueous solution containing an aggregating agent, and optionally cooling and optionally adding the wax, and other additives. For example, the toner may be formed in a process including admixing the latex emulsion and a colorant dispersion at a temperature of from about 30° C. to about 100° C., in embodiments from about 40° C. to about 90° C., in other embodiments from about 45° C. to about 80° C., and adding thereto an aggregating agent solution until aggregated particles of a desired volume average diameter are achieved, cooling and isolating the resulting toner, optionally washing with water, and drying the toner. The aforementioned temperatures for aggregation may be from about 3° C. to about 15° C. below the glass transition temperature of the latex, for example from about 4° C. to about 10° C. below the glass transition temperature or from about 5° C. to about 8° C. below the glass transition temperature.

For forming toner particles, the solids content of the latex emulsion may be from about 5 percent by weight (% wt) to about 50% wt of the emulsion, such as from about 5% wt to about 20% wt emulsion, or from about 10% wt to about 30% wt of the emulsion. To achieve this solids content, the latex emulsion may be diluted during formation as discussed above, or additional water may be added as discussed above to effect dilution during the toner particle formation process.

The dry toner particles, exclusive of external surface additives, may have a volume average diameter of about 3 to about 25 μm, from about 3 to about 12 μm or about 5 to about 10 μm. The particles may also have a geometric size distribution (GSD) (number and/or volume) of, for example, about 1.05 to about 1.35, such as about 1.10 to about 1.30 or about 1.15 to about 1.25. Herein, the geometric size distribution refers, for example, to the square root of D84 divided by D16, and is measured by a Coulter Counter. The particle diameters at which a cumulative percentage of, for example, 16 percent of particles are attained, refer to the volume and/or number D16 percent, and the particle diameters at which a cumulative percentage of 84 percent are attained are referred to as volume and/or number D84.

Aggregation and Coalescence

In embodiments, emulsion aggregation methods, for example wherein submicron sized particles of a binder resin in an emulsion are aggregated to toner particle size in the presence of an aggregating agent or coagulant, may be utilized to produce toner particles at temperatures of, for example, about 100° C. or less, such as from about 30° C. to about 100° C., or about 40° C. to about 90° C.

Any suitable aggregating agent may be utilized to form a toner. Suitable aggregating agents include, for example, halides such as chloride, bromide or iodide, or anions such as acetates, acetoacetates or sulfates, of vanadium, niobium, tantalum, chromium, molybdenum, tungsten, manganese, iron, ruthenium, cobalt, nickel, copper, zinc, cadmium and/or silver; aluminum salts such as aluminum sulfate, aluminum acetate, polyaluminum chloride and/or aluminum halides; mixtures thereof and the like. Alkali (II) metal salts, that is divalent alkali metal salts, that may be used as aggregating agents may include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, zinc acetate, strontium sulfate, barium chloride, barium bromide, barium iodide, or mixtures thereof.

The aggregating agent may be added to the mixture utilized to form a toner in an amount of, for example, from about 0.1 percent weight (% wt) to about 8% wt by weight, such as from about 0.2% wt to about 5% wt by weight, or from about 0.5% wt to about 5% wt by weight, of the total weight of the latex in the mixture. This provides a sufficient amount of agent for aggregation.

In order to control aggregation and coalescence of the particles, in embodiments the aggregating agent may be metered into the mixture over time. For example, the agent may be metered into the mixture over a period of from about 5 to about 240 minutes, such as from about 30 to about 200 minutes, although more or less time may be used as desired or required. The addition of the agent may also be accomplished while the mixture is maintained under stirred conditions, in embodiments from about 50 rpm to about 1,000 rpm, such as from about 100 rpm to about 500 rpm, and at elevated temperature.

The particles may be permitted to aggregate and/or coalesce until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation/coalescence thus may proceed by maintaining the elevated temperature, or slowly raising the temperature to, for example, from about 30° C. to about 100° C., and holding the mixture at this temperature for any appropriate time from about 0.5 hours to about 10 hours, such as from about 1 hour to about 5 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., such as from about 45° C. to about 80° C., which may be below the glass transition temperature of the resin as discussed above.

Following aggregation to the desired particle size, the particles may then be coalesced to the desired final shape, the coalescence being achieved by, for example, heating the mixture to a temperature of from about 50° C. to about 105° C., such as from about 65° C. to about 100° C., which may be at or above the glass transition temperature of the resin, and/or increasing the stirring, for example to from about 400 rpm to about 1,000 rpm, such as from about 500 rpm to about 800 rpm. Higher or lower temperatures may be used, it being understood that the temperature is a function of the resins used for the binder. Coalescence may be accomplished over a period of from about 0.01 to about 10 hours, such as from about 0.1 to about 6 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Optional Toner Additives

In embodiments, the toner particles may also contain other optional additives, as desired or required. For example, the toner may include positive or negative charge control agents, for example in an amount of from about 0.1 percent by weight (% wt) to about 10% wt of the total weight of the toner, such as from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84 or E88, available from Hodogaya Chemical; combinations thereof, and the like.

Optionally, the toner may further comprise external additive particles, such as flow aid additives, which additives may be present on the surface of the toner particles. Examples of these additives include metal oxides such as titanium oxide, silicon oxide, tin oxide, mixtures thereof, and the like; colloidal silicas, such as AEROSIL, metal salts and metal salts of fatty acids inclusive of zinc stearate, aluminum oxides, cerium oxides, and mixtures thereof. Each of these external additives may be present in an amount of from about 0.1 percent by weight to about 5 percent by weight of the toner, such as from about 0.25 percent by weight to about 1 percent by weight of the toner. Suitable additives include those disclosed in U.S. Pat. Nos. 3,590,000 and 6,214,507, the disclosures of each of which are hereby incorporated by reference in their entirety.

Toner Characteristics

In embodiments, the dry toner particles, exclusive of external surface additives, may have the following characteristics:

(1) Volume average diameter (also referred to as "volume average particle diameter") of from about 3 μm to about 25 μm, such as from about 5 μm to about 15 μm, of from about 7 μm to about 12 μm;

(2) Number Average Geometric Size Distribution (GSDn) and/or Volume Average Geometric Size Distribution (GSDv) of from about 1.05 to about 1.45, such as from about 1.1 to about 1.4; and/or (3) Circularity of from about 0.9 to about 1 (measured with, for example, a Sysmex FPIA 2100 analyzer).

The characteristics of the toner particles may be determined by any suitable technique and apparatus. Volume average particle diameter $D_{50v}$, GSDv, and GSDn may be measured by means of a measuring instrument such as a Beckman Coulter Multisizer 3, operated in accordance with the manufacturer's instructions. Representative sampling may occur as follows: a small amount of toner sample, such as about 1 gram, may be obtained and filtered through a 25 micrometer screen, then put in isotonic solution to obtain a concentration of about 10%, with the sample then run in a Beckman Coulter Multisizer 3.

Developers

The toner particles may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F., and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 percent by weight (% wt) to about 70% wt to about 70% wt to about 30% wt, such as from about 40% wt to about 60% wt to about 60% wt to about 40% wt. The coating may have a coating weight of, for example, from about 0.1% wt to about 5% wt of the carrier, such as from about 0.5% wt to about 2% wt of the total weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 percent weight (% wt) to about 10% wt, such as from about 0.01% wt to about 3% wt, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 μm in size, in embodiments from about 50 to about 75 μm in size, coated with about 0.5% wt to about 10% wt, such as from about 0.7% wt to about 5% wt, of a conductive polymer mixture including, for example, methylacrylate and carbon black using the process described in U.S. Pat. Nos. 5,236,629 and 5,330,874.

The earlier particles can be mixed with the toner particles in various suitable combinations. The concentrations are may be from about 1% wt to about 20% wt by weight of the toner composition. However, different toner and carrier percentages may be used to achieve a developer composition with desired characteristics.

The following Examples are being submitted to illustrate embodiments of the present disclosure. The Examples are intended to be illustrative only and is not intended to limit the scope of the present disclosure. Also, parts and percentages are by weight unless otherwise indicated. As used herein, "room temperature" refers to a temperature of from about 20° C. to about 25° C.

Example I

Figure 2:
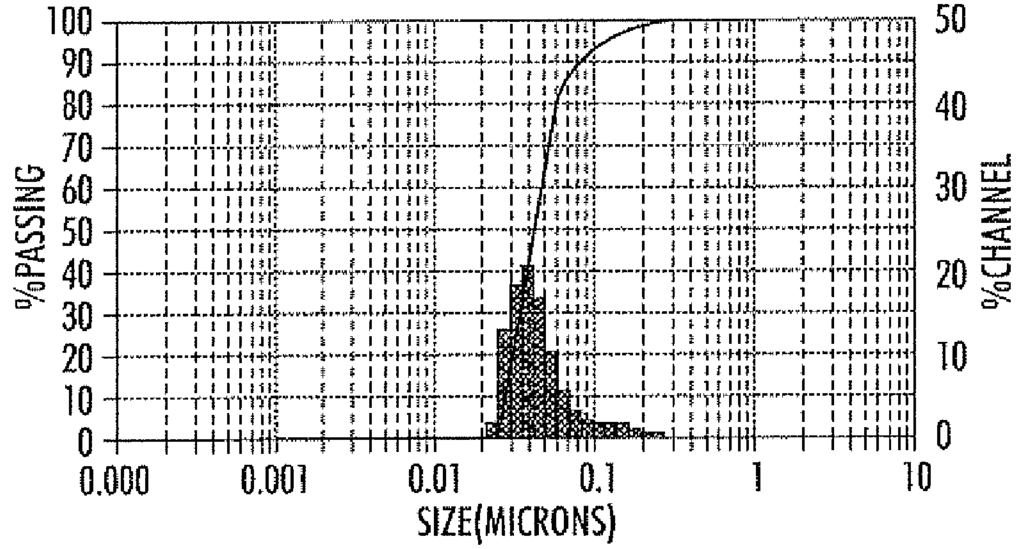
FIG. 2 is a chart and graph representing particle size and particle size distribution for a latex prepared according to an embodiment described in Example 1.

A crystalline polyester resin was prepared from dodecanedioic acid and nonane diol. A 2 liter Parr reactor, equipped with an electric heater, distillation apparatus and double turbine agitator and bottom drain valve, was charged with dodecanedioic acid (about 345 grams) 1,9-nonanediol (about 235 grams) and butyl tin oxide hydroxide (about 0.5 grams). The mixture was heated to about 185° C. for about 4 hours, during which time water was collected as a byproduct through the distillation apparatus. The mixture was then heated to about 205° C. for about 1 hour and then subjected to vacuum (about 0.1 mm-Hg) for a duration of about 1 hour after which the contents was cooled to 95° C. 450 grams of the resin was obtained. The resin product, poly(nonyl-dodecanoate), displayed a melting point of about 70° C. and a crystallization temperature of 59° C., a number average molecular weight of about 1,500 Daltons and a weight average molecular weight of about 3,100 Daltons. Subsequently, 71.7 grams of anionic surfactant (TAYCA paste, 62.8% wt, 10 pph) was added. After 30 minutes, 174 grams of sodium hydroxide (NaOH) solution (4.0% wt, 240% neutralization ratio) as a neutralizing agent was pumped into the mixture at an addition rate of 11.6 grams per minute for 15 minutes with mixing at a mixing speed of 100 rpm. After holding for 7 minutes, 1350 grams of de-ionized water preheated to 95° C. was pumped into the vessel using a FMI lab pump at a rate of 12 grams per minute. The emulsion obtained had an average particle size of 41.4 nm, as determined using a Nanotrac instrument. The particle size and size distribution evaluation results for the emulsion is depicted in FIG. 2.

Example II

In a series of continuous stirred tank reactors (CSTR), reactants and products are continuously fed and withdrawn. In the below example, five CSTRs are used to undertake the polycondensation for preparation of the polyester resin, and subsequently another three CSTRs are used to implement the emulsification for emulsified resin preparation.

In a first CSTR, dodecanedioic acid and nonanediol (molar ratio of 1.02) are reacted using a butyl tin oxide catalyst during the raw material preparation step to generate a pre-polymer product having a preliminary esterification at atmospheric or super-atmospheric pressure and at a temperature of about 180 C. This pre-polymer product is then reacted in a second CSTR wherein complete esterification is conducted at about 200° C. In the meantime, water, a by-product of the reaction, is removed from the esterification stage. After the esterification is completed, the pre-polymer is transferred into a third and fourth CSTR wherein the pre-polycondensation reaction is performed under vacuum and at a temperature of about 225° C. The pre-polycondensation product is then discharged into a fifth CSTR to complete the final polycondensation reaction. The polycondensation takes place under increased vacuum and at a further elevated temperature of about 260° C. The resulting polyester resin melt obtained in the fifth CSTR is transferred into a sixth CSTR wherein the polyester resin melt is neutralized by addition of the neutralizing agent sodium hydroxide under atmospheric pressure and at a temperature about 8° C. above the crystallization temperature of a crystalline resin such as poly(nonyl-dodecanoate), or about 10° C. above the softening point of an amorphous resin such as poly(co-propoxylated bisphenol co-ethoxylated bisphenol co-terephthalate). After the neutralization is completed, the neutralized resin melt is discharged into a seventh CSTR and mixed with a surfactant, forming a homogeneous mixture. Thereafter, the mixture is transferred to an eighth CSTR, where the emulsification takes place and phase inversion is created to form an aqueous dispersion by water addition.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A process for synthesizing a polyester latex, the process comprising:

providing to a reaction vessel a polyester-forming reaction mixture consisting of (1) diacid or diester monomer(s), (2) diol monomer(s), and (3) polycondensation catalyst (s), heating the reaction vessel to a temperature of from 65° C. to 360° C. and then polymerizing the diacid or diester monomer(s) with the diol monomer(s) to form a polyester melt resin comprising at least one polyester, after completion of the polymerizing, cooling the polyester melt resin to 50° C. to 150° C., and at the cooled temperature, providing a neutralizing solution comprising at least one neutralizing agent and at least one surfactant to the polyester melt resin to form an emulsification solution, and from the cooled temperature, maintaining or heating the emulsification solution to a temperature above a glass transition temperature or melting temperature of the at least one polyester, and then emulsifying the at least one polyester in the emulsification solution to synthesize the polyester latex, and wherein the emulsifying is accomplished without use of a solvent.

2. The process of claim 1, wherein the at least one polyester comprises at least one acid group.

3. The process of claim 2, wherein the at least one acid group is selected from the group consisting of carboxylic acids, carboxylic anhydrides, carboxylic acid salts and combinations thereof.

4. The process of claim 1, wherein the at least one polyester is at least one crystalline polyester, at least one amorphous polyester or a mixture of at least one crystalline polyester and at least one amorphous polyester.

5. The process of claim 1, wherein the at least one polyester has a glass transition temperature of from about 40° C. to about 100° C.

6. The process of claim 1, wherein the at least one polyester has a melting point of from about 30° C. to about 120° C. or a crystallization temperature of from about 20° C. to about 110° C.

7. The process of claim 1, wherein the at least one polyester has a $M_w$ of from about 5,000 to about 150,000.

8. The process of claim 7, wherein the at least one polyester has a $M_w$, of from about 18,000 to about 21,000.

9. The process of claim 1, wherein the at least one neutralizing agent is one or more members of the group consisting of ammonium hydroxide, potassium hydroxide, sodium hydroxide, sodium carbonate, sodium bicarbonate, lithium hydroxide, potassium carbonate, triethyl amine, triethanolamine, pyridine, pyridine derivatives, diphenylamine, diphenylamine derivatives, poly(ethylene amine), poly(ethylene amine) derivatives, amine bases and piperazine.

10. The process of claim 1, wherein the emulsification solution comprises at least one surfactant selected from the group consisting of anionic sulfate surfactants, anionic sulfonate surfactants, anionic acid surfactants, nonionic alcohol surfactants, nonionic acid surfactants, nonionic ether surfactants, cationic ammonium surfactants and cationic halide salts of quaternized polyoxyethylalkylamine surfactants.

11. The process of claim 1, wherein the polycondensation catalyst(s) is one or more members selected from the group consisting of dialkyltin oxides, tetraalkyltins, dialkyltin oxide hydroxides, aluminum alkoxides, alkyl zinc, dialkyl zinc, zinc oxide, stannous oxide and titanium (IV) alkoxides.

12. The process of claim 1, wherein the emulsifying includes adding water slowly until an emulsion forms by phase inversion.

13. A process for producing a toner, the process comprising:

providing to a reaction vessel a polyester-forming reaction mixture consisting of (1) diacid or diester monomer(s), (2) diol monomer(s), and (3) polycondensation catalyst (s), heating the reaction vessel to a temperature of from 65° C. to 360° C. and then polymerizing the diacid or diester monomer(s) with the diol monomer(s) to form a polyester melt resin comprising at least one polyester, after completion of the polymerizing, cooling the polyester melt resin to 50° C. to 150"C, and at the cooled temperature, providing a neutralizing solution comprising at least one neutralizing agent and at least one surfactant to the polyester melt resin to form an emulsification solution, from the cooled temperature, maintaining or heating the emulsification solution to a temperature above a glass transition temperature or melting temperature of the at least one polyester, and emulsifying the at least one polyester in the emulsification solution to form a polyester latex, combining the polyester latex with one or more colorant and an optional wax and aggregating the polyester latex, colorant and optional wax to form aggregated particles;

coalescing the aggregated particles to form toner particles; and washing and drying the toner particles to achieve a toner.

* * * * *